US008612456B2

(12) United States Patent
Bi et al.

(10) Patent No.: US 8,612,456 B2
(45) Date of Patent: Dec. 17, 2013

(54) SCHEDULING RECORDING OF RECOMMENDED MULTIMEDIA PROGRAMS

(75) Inventors: Haifeng Bi, San Antonio, TX (US); Xiaolian Bi, San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 376 days.

(21) Appl. No.: 12/333,095

(22) Filed: Dec. 11, 2008

(65) Prior Publication Data

US 2010/0153445 A1 Jun. 17, 2010

(51) Int. Cl.
G06F 17/30 (2006.01)

(52) U.S. Cl.
USPC .......... 707/749; 707/751; 707/913; 707/944; 725/97; 725/101

(58) Field of Classification Search
USPC .................... 707/749, 751; 705/14
See application file for complete search history.

(56) References Cited

U.S. PATENT DOCUMENTS

| 6,177,931 | B1 | 1/2001 | Alexander et al. | |
|---|---|---|---|---|
| 6,217,885 | B1 | 4/2001 | Roder et al. | |
| 6,774,926 | B1 | 8/2004 | Ellis et al. | |
| 7,095,402 | B2 | 8/2006 | Kunii et al. | |
| 7,200,611 | B2 | 4/2007 | Potrebic et al. | |
| 7,257,831 | B1* | 8/2007 | Ozawa | 725/86 |
| 7,370,343 | B1* | 5/2008 | Ellis | 725/58 |
| 7,689,493 | B1* | 3/2010 | Sullivan et al. | 705/36 R |
| 7,895,625 | B1* | 2/2011 | Bryan et al. | 725/46 |
| 2004/0205816 | A1 | 10/2004 | Barrett | |
| 2004/0216156 | A1 | 10/2004 | Wagner | |
| 2006/0218488 | A1* | 9/2006 | Shah et al. | 715/516 |
| 2006/0253869 | A1 | 11/2006 | Boyer et al. | |
| 2006/0294548 | A1 | 12/2006 | Potrebic et al. | |
| 2007/0011203 | A1* | 1/2007 | Tsunoda | 707/104.1 |
| 2007/0078849 | A1 | 4/2007 | Slothouber | |
| 2007/0186243 | A1* | 8/2007 | Pettit et al. | 725/46 |
| 2007/0245382 | A1* | 10/2007 | Doi et al. | 725/55 |
| 2008/0109306 | A1* | 5/2008 | Maigret et al. | 705/14 |
| 2008/0154724 | A1* | 6/2008 | Machlin et al. | 705/14 |
| 2008/0255934 | A1* | 10/2008 | Leventhal et al. | 705/14 |
| 2009/0019488 | A1* | 1/2009 | Ruiz-Velasco et al. | 725/43 |
| 2010/0030764 | A1* | 2/2010 | Koren | 707/5 |

* cited by examiner

Primary Examiner — Sangwoo Ahn
(74) Attorney, Agent, or Firm — Jackson Walker L.L.P.

(57) ABSTRACT

Users provide preferred multimedia programs types and receive electronic messages with recommendations for recording upcoming broadcasts. In response to receiving reply messages to the recommendations, the recommended multimedia programs may be scheduled for transport to the user. Example multimedia programs that may be recommended include without limitation television shows, sporting events, and pay-per-view events.

24 Claims, 3 Drawing Sheets

SCHEDULING RECORDING OF RECOMMENDED MULTIMEDIA PROGRAMS

BACKGROUND

1. Field of the Disclosure

The present disclosure generally relates to multimedia content distribution networks and more particularly to scheduling a recording of a recommended multimedia program.

2. Description of the Related Art

Multimedia programs may be received from a multimedia content distribution network (MCDN) and recorded using a digital video recorder (DVR). In many traditional systems, a user schedules recordings of multimedia programs by direct interaction with the DVR by selecting one or more elements from an electronic programming guide (EPG) presented by the DVR on a display.

DESCRIPTION OF EXEMPLARY EMBODIMENTS

Figure 1:
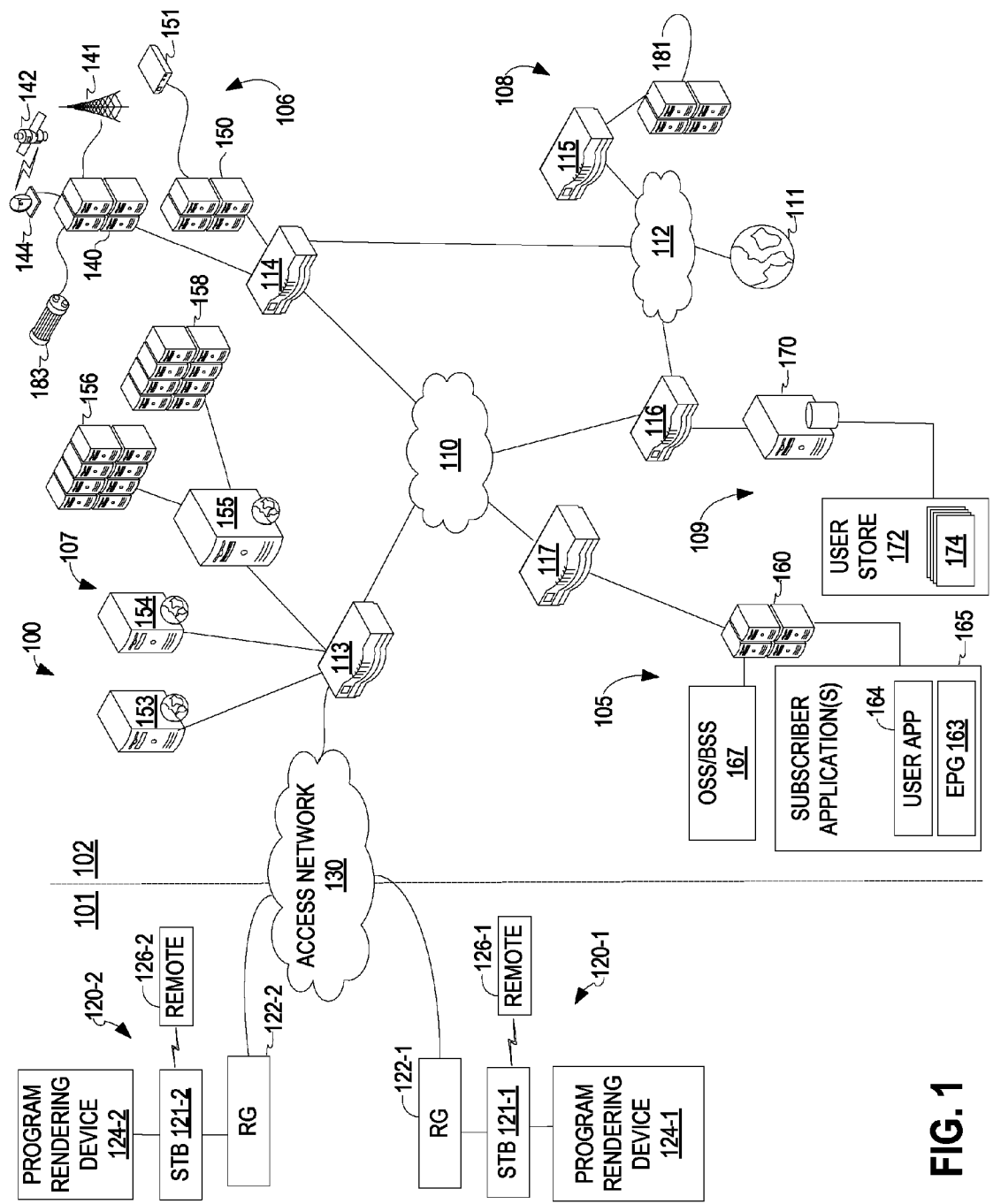
FIG. 1 illustrates a representative Internet protocol television (IPTV) architecture for providing multimedia programs and, in accordance with disclosed embodiments, scheduling the recording of recommended multimedia programs.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an set top box (STB), television, or other form of receiver is required to select a channel from the mixed signal for playing or recording. A user wishing to play or record multiple channels typically needs to have distinct tuners for each desired channel. This can be an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with customer premises equipment (CPE) including, for example, a digital subscriber line (DSL) modem in communication with an STB, a display, a program rendering device, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view (PPV), EPGs, and the like. Bidirectional networks may also enable a service provider to collect information related to a user's preferences, whether for purposes of providing preference based features to the user, providing potentially valuable information to service providers, or providing potentially lucrative information to content providers and others.

In one aspect, a disclosed process for scheduling transport of a multimedia program includes receiving a user input indicative of a user interest, determining a recommended multimedia program based on the user interest, sending an electronic recommendation message to a user, and scheduling the recommended multimedia program for transport to the user. Scheduling is responsive to receiving an electronic reply message from the user to receive the recommended multimedia program. In some embodiments, the electronic recommendation message is scheduled to occur at a predetermined time before an airing of the recommended multimedia program. The user may provide user input from a Web portal. The recommended multimedia program may be for example, without limitation, a PPV program, a television show episode, or a music program. The electronic recommendation message may be sent to a user communication address including an e-mail address or a short messaging service (SMS) address.

In another aspect, a disclosed service for providing a multimedia program for recording includes storing an indicator of a preferred multimedia program type received from a user, comparing the preferred multimedia program type to metadata for a plurality of stored multimedia programs, determining a multimedia program recommendation from the comparing, and sending a user a message with an indication of the multimedia program recommendation. If an affirmative reply message is received from the user, the recommended multimedia program is scheduled for recording. The message sent to the user with the recommendation for the multimedia program may be sent at a predetermined time (e.g., one day) before an airing of the recommended multimedia program.

Users may provide preferred multimedia program types using a Web portal. Example multimedia program types include genres such as drama, comedy, action, classic, sport, and mystery.

In still another aspect, a disclosed recommendation server includes a processor, an interface for receiving a user indicated parameter for selecting a multimedia program, a recommendation module for recommending a multimedia program from a database based on the user indicated parameter, an outgoing communication module for sending a textual message including an indication of the recommended multimedia program, and an incoming communication module for receiving a textual reply message requesting to receive the recommended multimedia program. The recommendation server also includes a recording scheduling module for scheduling the receipt of the recommended multimedia program in response to receipt of the textual reply message. In some embodiments, the recommendation server includes a communication scheduling module for scheduling upcoming program notifications. In some embodiments, the upcoming program notifications are scheduled to occur at a predetermined time (e.g., two days) before a scheduled airing of the recommended multimedia program. The textual message with the recommended multimedia program may be sent via e-mail or SMS text.

Below, exemplary embodiments are described in sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral refers to a specific instance of an element and an un-hyphenated form of the reference numeral refers to the element generically or collectively. Thus, for example, element 121-1 refers to an instance of an STB, which may be referred to collectively as STBs 121 and any one of which may be referred to generically as an STB 121.

Referring now to the drawings, FIG. 1 illustrates selected aspects of an MCDN 100 for transporting recommended multimedia programs for recording. MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 feet in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a program rendering device 124, and a remote control device 126. In the depicted embodiment, STB 121 communicates with server side devices through access network 130 via RG 122.

As shown in FIG. 1, RG 122 may include elements of a broadband modem (e.g., DSL modem or cable modem) and may communicate over wireless and/or wired interfaces. In addition, RG 122 may have elements of a firewall, router, switch, and access point for local area network (LAN) devices to communicate through wired and wireless (e.g., WiFi) Ethernet or other suitable networking technologies. In some embodiments, STB 121 is a uniquely addressable Ethernet compliant device. Program rendering device 124 may be, for example, any National Television System Committee (NTSC) and/or Phase Alternating Line (PAL) compliant program rendering device. Both STB 121 and program rendering device 124 may include any form of conventional frequency tuner.

In IPTV compliant implementations of MCDN 100, clients 120 are configured to receive packet-based multimedia streams from access network 130 and process the streams for presentation on program rendering devices 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by a parabolic dish 144. In addition, live acquisition server 140 may acquire programming feeds transmitted via high-speed fiber feed 183 or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using for example, Motion Picture Expert Group (MPEG) standards such as MPEG-2, MPEG-4, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to the OSS/BSS server 181. Upon client gateway 153 confirming subscriber and/or billing information, client gateway 153 may allow STB 121 access to IPTV content, VOD content and other services. If client gateway 153 cannot verify subscriber information (i.e., user information) for STB 121, for example, because it is connected to an unauthorized local loop or RG, client gateway 153 may block transmissions to and from STB 121 beyond access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that recommends multimedia programs for recording. In this case, application server 160 implements a recommendation server for scheduling the transport of recommended multimedia programs. Accordingly, user application server 164 receives a user input indicative of the user interest. In some embodiments, a user indicated interest may be provided by a personal computer (PC), smart phone, or using a remote control device (e.g., a remote control device 126). The user indicated interest may specify that the user wishes to receive recommendations of multimedia programs with certain quality ratings, genres, lengths, subject matters, appropriateness ratings, or the like. For example, a user may indicate an interest in travel. Accordingly, disclosed systems identify multimedia programs that pertain to travel. Some disclosed systems may, in response to receiving an indication of particular user interest, provide a user with subcategories of the user interest. For example, a user that expresses an interest in travel may be allowed to specify an interest in, for example, outer space travel or travel to geographic regions including Europe, South America, North America, Asia, and Africa. In some embodiments, application server 160 may host a Web portal or receive the user indicated interest information from a remotely hosted Web portal that is accessed by the user. When accessing the Web portal, a user may provide a communication address for sending recommendations to the user. For example, a user may provide an e-mail address or an SMS text message address (i.e., a mobile telephone number) for receiving multimedia program recommendations.

Based on the user indicated interest, application server 160 determines, identifies, or selects a recommended multimedia program. The recommended multimedia program may be a PPV program or a music program, as examples. The recommended multimedia program may be determined by comparing the user indicated interest to metadata stored for a plurality of multimedia programs. User application 164 may access data provided by EPG application 163 to determine when future broadcasts will include multimedia programs that may be of interest to the user. In response to identifying one or more recommended multimedia programs, user application 164 sends or causes to be sent to the user an electronic recommendation message with an indication of the recommended multimedia program. For example, the user may be sent an e-mail message with the title of a recommended multimedia program. Alternatively, an SMS text message may be sent with the title, duration, quality ratings, and so forth. Sending the electronic message may be scheduled for a predetermined time before the airing (i.e., broadcast or simulcast) of the recommended multimedia program. For example, user application 164 may schedule sending the electronic recommendation message to occur one day or one hour before the recommended multimedia program is scheduled to air.

In the context of this disclosure, the term "air" is not intended to require that a multimedia program is transmitted by or through air using radio waves. Indeed, the term is meant to include other methods, protocols, or media for transmitting, broadcasting, simulcasting, unicasting, providing for download, or otherwise providing access to multimedia programs including transmission over fiber-optic cables, coaxial cables, digital subscriber lines, WiFi networks, and the like. In some embodiments, a user may already have possession of a tangible medium on which a multimedia program is stored, and the term "air" may include that the user is granted access to the multimedia program.

Responsive to receiving an electronic reply message from the user to receive the recommended multimedia program, user application 164 schedules the recommended multimedia program for transport to the user. The user may send an e-mail or an SMS text message as a reply message. The reply message may contain textual information such as the word "record" in the subject line of an e-mail. In some embodiments, the electronic recommendation message may include a message to the user, "reply to this message if you wish to schedule the recording of the recommended program." In this case, any reply to the message from the user may result in the multimedia programming being scheduled for transport to the user for recording. In some embodiments, user application 164 communicates with user CPE (e.g., STB 121) to instruct the CPE to access the recommended multimedia program according to the user request.

As shown, MCDN 100 may implement an embodied service by providing a multimedia program recommendation and responding to requests to record the recommended multimedia program. The disclosed service includes storing an indicator of a preferred multimedia program type received from a user. The preferred multimedia type may specify sporting events, action movies, cartoons, dramas, soap operas, and the like. The preferred multimedia type may be entered using a data processing system (e.g., a smart phone or PC) communicatively coupled to a Web portal. The preferred multimedia type may also be entered using a CPE device communicatively coupled to an MCDN. The service further includes comparing the preferred multimedia program type to metadata for a plurality of stored multimedia programs and determining a multimedia program recommendation. For example, if a preferred multimedia program type is professional football games, the service includes scanning metadata for a plurality of scheduled multimedia programs to detect instances in which professional football games will be broadcast or otherwise available for recording or download. After a multimedia program recommendation is selected, the service sends to the user a message with an indication of the multimedia program recommendation. The multimedia program recommendation message may be sent by e-mail, text message (e.g., SMS text message) or other such methods. In some embodiments of the service, sending the recommendation occurs at a predetermined time (e.g., two days) before an airing of the recommended multimedia program. If an affirmative reply to the message is received, the service schedules the recommended multimedia program for recording. For example, a user may reply to the multimedia program recommendation message by selecting a "record" hyperlink in an e-mail. Alternatively, if the multimedia program recommendation message is an e-mail for example, the user may simply reply to the e-mail with the word "record" in the subject line. Accordingly, the service includes scheduling the recommended multimedia program for transport to the user. Transport of the recommended multimedia program may be by download (e.g., by FTP) to a user CPE such as a PC. Alternatively, transport of the recommended multimedia program to a user DVR may occur during scheduled broadcast. In such cases, the service may include automatically instructing a user CPE to access the multimedia program at a scheduled time. Instructing the user CPE may be performed automatically by components of an MCDN (e.g., MCDN 100 in FIG. 1) over an access network (e.g., access network 130 in FIG. 1).

Figure 2:
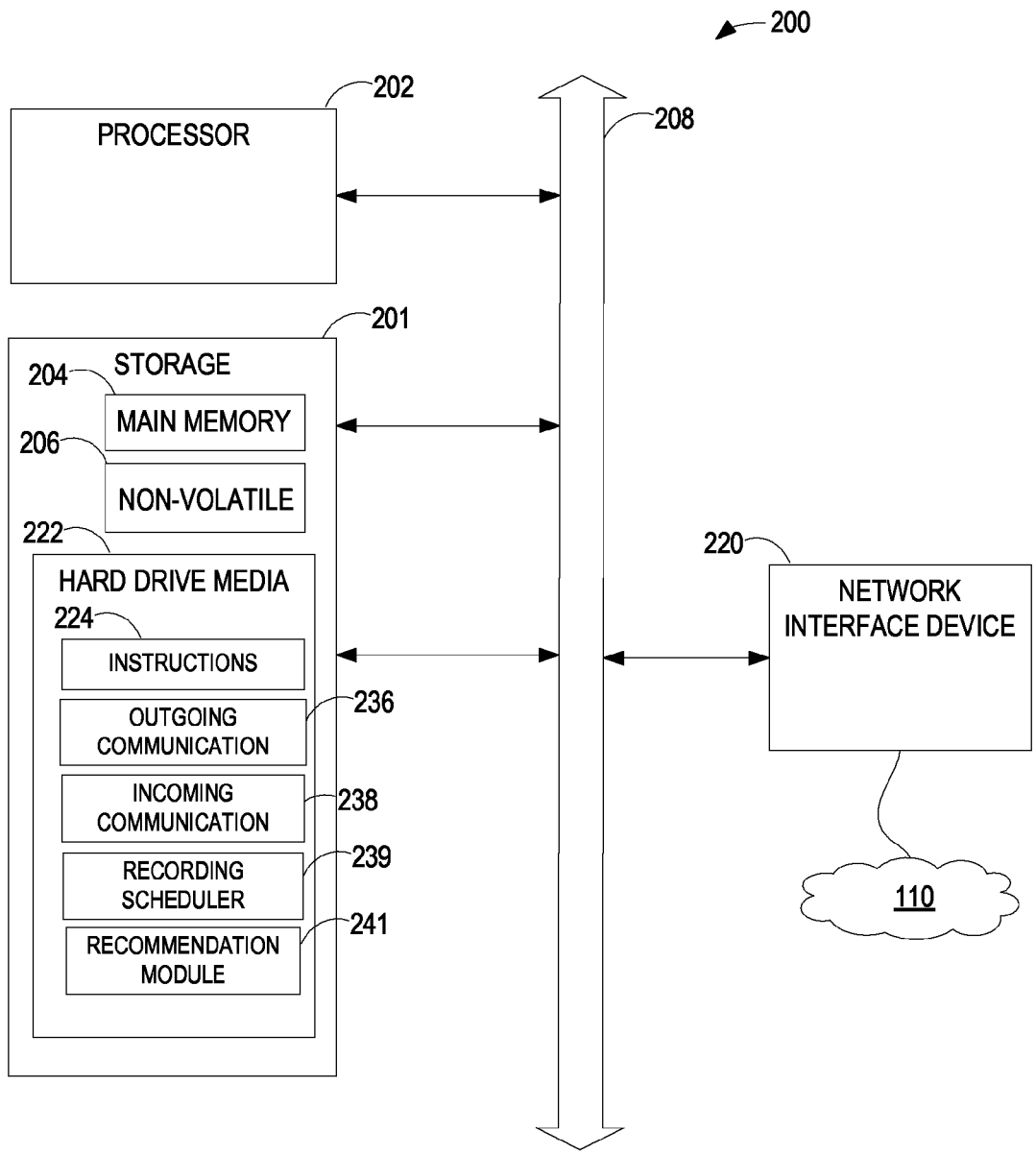
FIG. 2 is a block diagram of selected elements of a recommendation and scheduling server that may be used in implementations of disclosed embodiments for providing multimedia program recommendations and scheduling recommended multimedia programs for recording.

FIG. 2 illustrates, in block diagram form, selected elements of an embodiment of a recommendation and scheduling server 200 within which a set of instructions operates to implement the processes and systems discussed herein. Recommendation and scheduling server 200 may operate as a standalone device or may be connected (e.g., networked) to other data processing systems. While recommendation and scheduling server 200 is illustrated as only a single data processing system, it also may include a collection of data processing systems that individually or jointly execute a set (or multiple sets) of instructions to perform any one or more of the methodologies discussed herein.

As shown in FIG. 2, recommendation and scheduling server 200 includes processor 202 (e.g., a central processing unit, a graphics processing unit, or both) and storage 201 that includes main memory 204 and non-volatile memory 206. Storage 201 and its related components communicate with processor 202 via bus 208. Storage 201 includes hard drive media 222 which may be a magnetic, optical, or solid state machine-readable medium. As shown, hard drive media 222 has one or more sets of stored instructions 224 and data structures (not depicted) embodying or utilized by any one or more of the processes, systems, or functions described herein. The instructions 224 may also reside, completely or at least partially, within the main memory 204, within non-volatile memory 206, and/or within the processor 202 during execution thereof by recommendation and scheduling server 200. In some embodiments, hard drive media 222, main memory 204 and/or non-volatile memory 206 may be used to store user preferences regarding multimedia programs, metadata for available multimedia programs, outgoing messages with multimedia program recommendations, Web portal data, incoming reply messages requesting the transport of recommended multimedia programs, EPG data, and the like.

As shown, recommendation and scheduling server 200 includes network interface device 220 for communicating with network 110, which may correspond to network 110 in FIG. 1. For simplicity in FIG. 2, recommendation and scheduling server 200 is shown with a direct communication link to network 110; however, intermediate networks, transmitters, receivers, switches, firewalls, routers and other components may be present in the communication link between network interface device 220 and network 110.

As shown, user indicated parameters for selecting a multimedia program to recommend may be received over network interface device 220. User indicated parameters may specify genre, titles, actors, production dates, viewing length and other such parameters that may characterize multimedia programs. Recommendation module 241 processes the user indicated parameters, compares the user indicated parameters to metadata for a plurality of available multimedia programs, and selects one or more multimedia programs to recommend to the user for recording.

Upon recommendation module 241 selecting one or more multimedia program recommendations, a recommendation message may be sent or scheduled for sending by outgoing communication module 236. Outgoing communication module 236 may schedule sending multimedia program recommendations at a predetermined time (e.g., two days) before a scheduled airing of the recommended multimedia program. In some embodiments, outgoing communication module 236 formats text-based messages with multimedia program recommendations for sending to users. Additionally, outgoing communication module 236 may send e-mail messages with multimedia program recommendations.

If a user chooses to schedule the recommended multimedia program for recording, the user sends a reply message to the multimedia program recommendation message. The reply message may be an SMS text message or e-mail, as examples that are received by network interface device 220. Incoming communication module 238 processes the reply messages and recording scheduler module 239 schedules transport of the recommended multimedia program to the user. Transport of the recommended multimedia program may be to a user CPE, a user DVR, a user STB, a user smart phone, or to a user e-mail account, as examples. Accordingly, recommendation and scheduling server 200 may perform any of the disclosed processes for receiving user preferences for multimedia programs, providing multimedia program recommendations based on the user preferences, sending a multimedia program recommendation message, and scheduling transport of the recommended multimedia program in response to receiving a reply message from the user.

In some embodiments, instructions 224 and portions of the disclosed modules may be transmitted or received over network 110 (e.g., a multimedia content provider network) via network interface device 220 using any one of a number of transfer protocols (e.g., broadcast transmissions, HTTP). As shown in FIG. 2, storage 201 and hard drive media 222 may include a single machine-readable medium or multiple machine-readable media (e.g., a centralized or distributed database, and/or associated caches and servers) that may store all or part of instructions 224. The term "machine-readable medium" should be taken to include any medium that is capable of storing, encoding, or carrying a set of instructions (e.g., instructions 224) for execution by a machine (e.g., recommendation and scheduling server 200) and that cause the machine to perform any one or more of the methodologies or that is capable of storing, encoding, or carrying data structures utilized by or associated with such a set of instructions. The term "machine-readable medium" shall, accordingly, be taken to include but not be limited to solid-state memories, optical media, and magnetic media.

Figure 3:
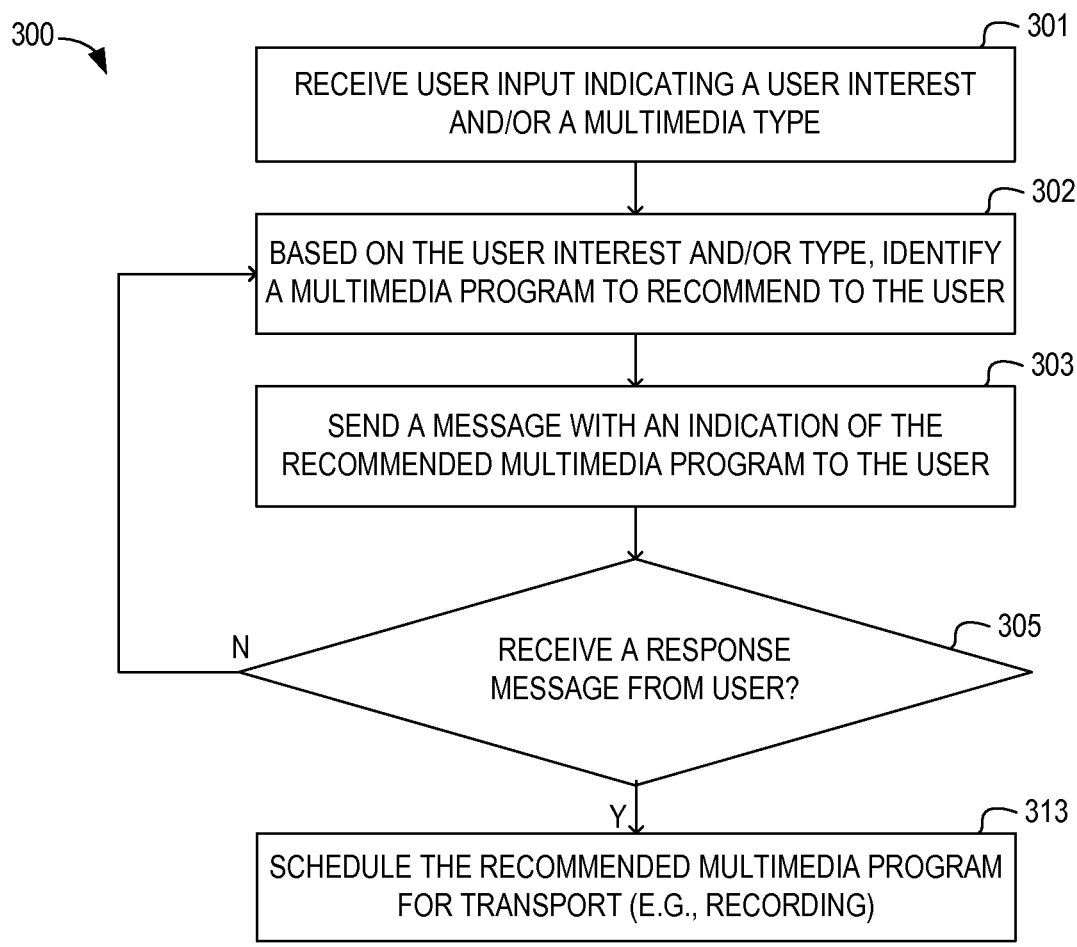
FIG. 3 illustrates selected operations of a method for scheduling the recording of recommended multimedia programs.

Referring now to FIG. 3, a process 300 is disclosed for scheduling transport of recommended multimedia programs. As shown, process 300 includes receiving (block 301) user input indicating a user interest and/or a multimedia type. Based on the user interest and/or multimedia type, a multimedia program is identified (block 302) as a recommendation to the user. The message is sent (block 303) to the user with an indication (e.g., a title) of the recommended multimedia program. If a response message is received (block 305) from the user, the recommended multimedia program is scheduled (block 313) for transport (e.g., recording) to the user. For example, the multimedia program may be scheduled for transport to a user e-mail account, STB, or PC. If no response message is received (block 305) from the user, process 300 as shown may identify further multimedia programs to recommend to the user.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A process for scheduling transport of a multimedia program, the process comprising:
   receiving a user input indicative of a user interest;
   determining, by an application server, a recommended multimedia program based on the user interest;
   at a scheduled time, sending to a communication address associated with the user an electronic recommendation message with an indication of the recommended multimedia program, wherein the scheduled time occurs a fixed interval of time before an airing of the recommended multimedia program;
   responsive to receiving an electronic reply message including a predetermined word in a predetermined field of the message from the user, scheduling the recommended multimedia program for transport to an email account associated with the user, wherein the predetermined field comprises a subject field of the electronic reply message; and
   transporting the recommended multimedia program to the email account.

2. The process of claim 1, wherein the electronic reply message is generated in response to the user selecting a hyperlink in the electronic recommendation message.

3. The process of claim 1, wherein the user input is received from a Web portal.

4. The process of claim 3, wherein the Web portal is accessed from a multimedia content distribution network.

5. The process of claim 1, further comprising:
   receiving the communication address associated with the user.

6. The process of claim 5, wherein the communication address is an e-mail address.

7. The process of claim 5, wherein the communication address is a short messaging service address.

8. A method for providing a multimedia program for recording, the method comprising:
   storing an indicator of a preferred multimedia program type received from a user;
   comparing, at a server of a multimedia content distribution network, the preferred multimedia program type to metadata for a plurality of stored multimedia programs;
   based on the comparing, determining, by the server, a multimedia program recommendation;
   at a scheduled time, sending to the user a recommendation message with an indication of the multimedia program recommendation, wherein the scheduled time occurs a fixed interval of time before an airing of the multimedia program;
   responsive to receiving a reply including a predetermined word in a predetermined field of the reply affirming the message, scheduling for recording a multimedia program corresponding to the multimedia program recommendation; and
   transporting the multimedia program corresponding to the multimedia program recommendation to an email account associated with the user.

9. The method of claim 8, wherein the reply is selected from email and short messaging service and wherein the reply is generated in response to the user selecting a hyperlink in the message.

10. The method of claim 8, wherein the indicator of the preferred multimedia program type is received from a Web portal.

11. The method of claim 10, wherein the preferred multimedia program type is indicative of a genre.

12. The method of claim 8, wherein the scheduling of the recording is by a user customer premises equipment.

13. The method of claim 12, further comprising:
    instructing the user customer premises equipment to access the multimedia program at a scheduled time.

14. The method of claim 8, wherein the scheduling comprises scheduling the recording to occur during one of a broadcast or simulcast of the multimedia program to other users.

15. The method of claim 8, wherein the reply includes textual data input by the user.

16. The method of claim 8, wherein sending the message with the indication of the multimedia program recommendation comprises sending via email and wherein the reply is sent via email.

17. The method of claim 8, wherein sending the message with the indication of the multimedia program recommendation comprises sending via short messaging service and wherein the reply is sent via short messaging service.

18. A recommendation server comprising:
a processor;
an interface for receiving a user indicated parameter for selecting a multimedia program;
a computer readable medium, accessible to the processor, including stored instructions, which when executed by the processor, cause the processor to perform operations comprising:
identifying a recommended multimedia program from a database based on the user indicated parameter;
sending, at scheduled time, a textual message including an indication of the recommended multimedia program, wherein the scheduled time occurs a fixed interval of time before a scheduled airing of the recommended multimedia program;
responsive to receiving a textual reply message including a predetermined word in a predetermined field of the reply message, scheduling the receipt of the recommended multimedia program in response to receipt of the textual reply message; and
transporting the recommended multimedia program to an email account associated with a user;
wherein the textual message is sent via a message service selected from e-mail and short messaging service, and wherein the textual reply message is sent via a reply service selected from e-mail and short messaging service.

19. The recommendation server of claim 18, wherein the textual message is sent via e-mail, and wherein the textual reply message is sent via e-mail.

20. The recommendation server of claim 18, wherein the textual message is sent via short messaging service protocol, wherein the textual reply message is sent via short messaging service protocol, and wherein the user parameter includes a genre.

21. The recommendation server of claim 18, wherein:
the textual reply message is generated in response to the user selecting a hyperlink in the textual message.

22. The process of claim 1, wherein the recommended multimedia program is a pay-per-view program.

23. The method of claim 8, wherein the recommended multimedia program is a pay-per-view program.

24. The recommendation server of claim 18, wherein the recommended multimedia program is a pay-per-view program.

* * * * *

UNITED STATES PATENT AND TRADEMARK OFFICE
CERTIFICATE OF CORRECTION

Page 1 of 3

PATENT NO. : 8,612,456 B2
APPLICATION NO. : 12/333095
DATED : December 17, 2013
INVENTOR(S) : Haifeng Bi et al.

It is certified that error appears in the above-identified patent and that said Letters Patent is hereby corrected as shown below:

In the Claims

Column 12, Line 28 through Column 14, Line 27 please rearrange, amend, and/or renumber claims 8 through 24, as follows: (The underlined number is what it should be.)

[[22]] 8. The process of claim 1, wherein the recommended multimedia program is a pay-per-view program.

[[8]] 9. A method for providing a multimedia program for recording, the method comprising:

storing an indicator of a preferred multimedia program type received from a user;

comparing, at a server of a multimedia content distribution network, the preferred multimedia program type to metadata for a plurality of stored multimedia programs;

based on the comparing, determining, by the server, a multimedia program recommendation;

at a scheduled time, sending to the user a recommendation message with an indication of the multimedia program recommendation, wherein the scheduled time occurs a fixed interval of time before an airing of the multimedia program;

responsive to receiving a reply including a predetermined word in a predetermined field of the reply affirming the message, scheduling for recording a multimedia program corresponding to the multimedia program recommendation; and transporting the multimedia program corresponding to the multimedia program recommendation to an email account associated with the user.

[[9]] 10. The method of claim [[8]] 9, wherein the reply is selected from email and short messaging service and wherein the reply is generated in response to the user selecting a hyperlink in the message.

Signed and Sealed this
Twenty-fifth Day of March, 2014

Michelle K. Lee
*Deputy Director of the United States Patent and Trademark Office*

[[10]] 11. The method of claim [[8]] 9, wherein the indicator of the preferred multimedia program type is received from a Web portal.

[[11]] 12. The method of claim [[10]] 11, wherein the preferred multimedia program type is indicative of a genre.

[[12]] 13. The method of claim [[8]] 9, wherein the scheduling of the recording is by a user customer premises equipment.

[[13]] 14. The method of claim [[12]] 13, further comprising:

instructing the user customer premises equipment to access the multimedia program at a scheduled time.

[[14]] 15. The method of claim [[8]] 9, wherein the scheduling comprises scheduling the recording to occur during one of a broadcast or simulcast of the multimedia program to other users.

[[15]] 16. The method of claim [[8]] 9, wherein the reply includes textual data input by the user.

[[16]] 17. The method of claim [[8]] 9, wherein sending the message with the indication of the multimedia program recommendation comprises sending via email and wherein the reply is sent via email.

[[17]] 18. The method of claim [[8]] 9, wherein sending the message with the indication of the multimedia program recommendation comprises sending via short messaging service and wherein the reply is sent via short messaging service.

[[23]] 19. The method of claim [[8]] 9, wherein the recommended multimedia program is a pay-per-view program.

[[18]] 20. A recommendation server comprising:

a processor;

an interface for receiving a user indicated parameter for selecting a multimedia program;

a computer readable medium, accessible to the processor, including stored instructions, which when executed by the processor, cause the processor to perform operations comprising:

identifying a recommended multimedia program from a database based on the user indicated parameter;

sending, at scheduled time, a textual message including an indication of the recommended multimedia program, wherein the scheduled time occurs a fixed interval of time before a scheduled airing of the recommended multimedia program;

responsive to receiving a textual reply message including a predetermined word in a predetermined field of the reply message, scheduling the receipt of the recommended multimedia program in response to receipt of the textual reply message; and transporting the recommended multimedia program to an email account associated with a

CERTIFICATE OF CORRECTION (continued)
U.S. Pat. No. 8,612,456 B2 user;

wherein the textual message is sent via a message service selected from e-mail and short messaging service, and wherein the textual reply message is sent via a reply service selected from e-mail and short messaging service.

[[19]] 21. The recommendation server of claim [[18]] 20, wherein the textual message is sent via e-mail, and wherein the textual reply message is sent via e-mail.

[[20]] 22. The recommendation server of claim [[18]] 20, wherein the textual message is sent via short messaging service protocol, wherein the textual reply message is sent via short messaging service protocol, and wherein the user parameter includes a genre.

[[21]] 23. The recommendation server of claim [[18]] 20, wherein:

the textual reply message is generated in response to the user selecting a hyperlink in the textual message.

[[22]] 24. The recommendation server of claim [[18]] 20, wherein the recommended multimedia program is a pay-per-view program.